Reissued Jan. 14, 1941

Re. 21,693

UNITED STATES PATENT OFFICE 21,693

PREPARATION OF PURE TITANIUM DIOXIDE

Walter W. Plechner, Metuchen, and Arthur W. Hixson, Leonia, N. J., assignors to National Lead Company, New York, N. Y., a corporation of New Jersey No Drawing. Original No. 2,113,946, dated April 12, 1938, Serial No. 109,458, November 6, 1936. Application for reissue December 15, 1939, Serial No. 309,378

5 Claims. (Cl. 23—202)

The present invention relates to titanium dioxide pigments. It has special reference to titanium dioxide pigments wherein the titanium dioxide is of rutile modification.

In our copending application, Serial No. 754,464, filed November 23, 1934, we have disclosed a method for preparing titanium dioxide suitable for use as a pigment and possessing the crystalline structure and form of rutile.

It is believed that the hiding power of a pigment is some function of the refractive index among other properties; the greater the difference between the refractive index of the pigment and that of the vehicle in which it may be suspended the greater will be the hiding power of the pigment. In this way is partially explained the relatively high hiding power of the titanium pigments. Thus the refractive indices of a few of the common white pigments are:

| | |
|---|---|
| Titanium dioxide (anatase) | 2.55 |
| Zinc sulphide | 2.37 |
| Lead basic carbonate | 1.99 |
| Zinc oxide | 1.90 |
| Blanc fixe | 1.64 |
| Linseed oil | 1.49 |

Titanium dioxide which has hitherto been commercially prepared has always been precipitated by the hydrolysis of sulphuric acid solutions of titanium, and, as has been shown by Weiser and Milligan: J. Phys. Chem. 38, 513 (1934), such an oxide always exists as the anatase modification which has the refractive index indicated in the above tabulation.

It has been long known that the refractive index of the rutile modification of titanium dioxide is 2.71, and, therefore, if titanium dioxide could be so precipitated as to form rutile on calcination, and, furthermore, if the precipitation conditions, or "hydrolysis conditions" as it is frequently called in the art, were such as to form particles which on calcination were suitable for pigment purposes, a new white pigment far superior in hiding power to the pigment grade titanium oxides now commercially available would have been obtained.

It, also, was shown by Weiser and Milligan in the publication cited above that when titanium dioxide is precipitated from a chloride solution the rutile modification is always obtained. Titanium dioxide has not been prepared under such conditions in the past because until the time of our discovery it was not known how to precipitate the oxide from a chloride solution and obtain the other properties, (purity, whiteness, proper particle size, filterability, etc.), necessary for the production of a material suitable for pigment purposes. Titanium dioxide which has been precipitated from chloride solutions by others has usually been in peptized, or extremely finely-divided, condition, and, therefore, has been extremely difficult to filter and impossible to wash free from impurities contained in the mother liquor. This extreme fineness of particle size and difficulty in washing has resulted in calcined products of very poor color and very low hiding power, entirely unsuitable for use as a pigment.

We have discovered that under suitable conditions, to be disclosed below, titanium dioxide adapted to pigment uses can be precipitated from a titanium chloride solution. Furthermore, pigment so obtained shows a remarkably improved tinting strength and hiding power over titanium dioxide pigments hitherto offered in the trade. Thus, if tinting strength is determined by the tentative method of test of the American Society of Testing Materials, A. S. T. M. Designation: D352–31T, A. S. T. M. Tentative Standards 1933, 525, the highest value shown by old commercial products is about 1100–1200, whereas our pigment gives values of 1400–1500. The hiding power of our form of titanium dioxide is correspondingly greater. We now ascribe this to the fact that our pigment is in the rutile modification since it is precipitated from a chloride solution, and has, therefore, a higher refractive index than the ordinary titanium dioxide pigment.

It may be stated, therefore, that it is one of the primary objects of the present invention to provide titanium dioxide which possesses tinting strength and hiding power greatly improved over similar types of pigments hitherto used, and which is readily derived from a titanium chloride solution.

We have discovered that hydrous titanium oxide may be precipitated from a chloride solution in a form which, upon calcination, yields rutile titanium dioxide eminently adaptable for use as a pigment if the precipitation, or hydrolysis, is carried on under such conditions as to give relatively rapid precipitation in the presence of coagulants which prevent the well-known peptizing action of the chloride ion. Our present invention contemplates the use of coagulants which overcome the peptizing action and permits the hydrous titanium oxide to develop a particle size requisite for a product designed to be used as a pigment. These coagulants may be broadly defined as polyvalent, negative ions which will include di- and trivalent negative ions of inorganic acids, as well as ionizable organic acids. For example, the citrate, phosphate, oxalate, tartrate, sulfate, arsenate, and when the hydrous titanium oxide is precipitated in the cold, the carbonate ion, and other polyvalent ions behave as coagulants during the hydrolysis and cause the hydrous titanium oxide to be precipitated in a readily filterable and easily washed state. The titanium dioxide obtained from the calcination of hydrous titanium oxide so precipitated has remarkably high hiding power and tinting strength and is comparable in all other respects to the titanium pigment of the prior art.

In our aforementioned copending application we have shown a coagulating effect of divalent negative ions upon precipitation of hydrous titanium oxide from chloride solutions. We have now found that trivalent negative ions, such as the phosphate and citrate ions are also effective as coagulents for hydrous titanium oxide precipitated from chloride solutions.

Hence, one object of the present invention is a method for preparing pigmentary titanium dioxide of the rutile modification. Another object of our invention is an improved method of utilizing chloride solutions of titanium in the preparation of titanium pigments. These, and other objects of our invention, will be understood from this description.

The coagulating agents of the present invention are effective when used in small amounts. Generally, an amount about 1% calculated as weight of the polyvalent negative radical on the basis of $TiO_2$ present in the solution, should be employed. However, amounts as low as 0.05% are effective. It will be understood by those skilled in the art that these polyvalent negative ions have a tendency to associate themselves as by adsorption with the particles of hydrous titanium oxide and are not removed by washing. This is particularly true of the sulfate and phosphate ions. Consequently, it will be understood that the amount of coagulating agent to be employed should not be so great as to undesirably contaminate the hydrous titanium oxide.

The titanium chloride solution maye be employed as a relatively concentrated solution containing about 15%, or thereabouts, of titanium dioxide and being substantially free from impurities. It will be understood that such solutions give optimum results but our invention is not to be limited to any particular concentration of titanium in the chloride solution nor to any condition of purity of the said solution.

The titanium solution may be added to hot water containing the desired amount of coagulant or the coagulant may be added as an aqueous solution to the titanium solution. The coagulant may be used in the form of the acids of the respective polyvalent negative radicals or aqueous solutions of salts of these acids such as the alkaline salts, for example, sodium sulfate, ammonium oxalate, lithium carbonate, sodium arsenate, sodium citrate, potassium tartrate, etc. A convenient method of employing the coagulant is to dissolve it in a large volume of water, then to raise the temperature of the solution and to add thereto the titanium chloride solution.

The coagulating agents of the present invention are effective regardless of how the hydrous titanium oxide is precipitated from the chloride solution. For example, the hydrous titanium oxide may be precipitated in the well-known manner by thermal hydrolysis brought about by raising the temperature of the solution to, or approaching, the boiling point which may or may not be accompannied by a dilution of the titanium solution. On the other hand, the hydrous titanium oxide may be precipitated by adding to the titanium solution, at ordinary or even reduced temperature, an alkaline or neutralizing agent, such as an alkaline hydroxide or carbonate of ammonia. Strictly speaking, all these methods of precipitating hydrous titanium oxide may be regarded as an hydrolysis and accordingly, it will be understood that when using the term, "hydrolytically precipitating" in this description and in the claims appended hereto, we mean to embrace these methods. In both cases, the presence of a small amount of coagulant permits the precipitation of hydrous titanium oxide in a non-peptized condition and possessing the desirable characteristics herein set forth.

Having thus described our invention the following examples are given for illustrative purposes from which, however, no limitations are to be construed.

*Example No. 1.*—Titanium tetrachloride is dissolved in two volumes of cold water yielding a clear aqueous chloride solution of titanium containing about 15 per cent titanium dioxide. All the iron present is reduced to the ferrous condition in order to prevent the hydrolysis which ferric salts readily undergo. In order to insure the absence of ferric iron throughout the precipitation, we prefer to reduce the solution to a content of two to three grams per liter of titanium dioxide in the titanous state. Having 1000 pounds of this chloride solution containing 15 per cent titanium oxide, this is added to 7000 pounds of boiling water containing two pounds of citric acid, during about one hour. When the addition has been completed about 95 per cent of the titanium will have been precipitated as hydrous titanium dioxide; the latter is in a coagulated form such that it settles well and may be readily filtered and washed. After filtration and washing the precipitate is converted to the anhydrous rutile form by calcining at a temperature of from 700 to 1000° C.

*Example 2.*—Having 1000 pounds of chloride solution containing 15 per cent titanium oxide, this is added to 10,000 pounds of boiling water containing 10 pounds of oxalic acid during about one hour. When the addition has been completed about 95 per cent of the titanium will have been precipitated as hydrous titanium dioxide; the latter is in a coagulated form such that it settles well and may be readily filtered and washed. After filtration and washing the precipitate is converted to the anhydrous rutile form by calcining at a temperature of from 700° to 1000° C.

The foregoing description of our invention has been given for clearness of understanding and no undue limitations should be deduced therefrom but the appended claims should be interpreted as broadly as possible in view of the prior art.

We claim:

1. Process for the preparation of titanium dioxide having rutile crystalline structure which comprises hydrolytically precipitating non-peptized, easily filterable, hydrous titanium oxide from an aqueous titanium chloride solution containing a small amount of a negative, polyvalent coagulant ion, separating the said hydrous titanium oxide and calcining it to rutile crystalline structure.

2. Process for the preparation of titanium dioxide having rutile crystalline structure which comprises hydrolytically precipitating non-peptized, easily filterable hydrous titanium oxide from an aqueous titanium chloride solution containing a small smount of a trivalent, negative coagulating ion, separating the said hydrous titanium oxide and calcining it to rutile crystalline structure.

3. Process for the preparation of titanium dioxide having rutile crystalline structure which comprises hydrolytically precipitating non-peptized, easily filterable hydrous titanium oxide from an aqueous titanium chloride solution containing a small amount of a coagulant selected from the group consisting of the acids and alkali metal salts of the phosphate and citrate radicals, separating the said hydrous titanium oxide and calcining it to rutile crystalline structure.

4. Process for the preparation of titanium dioxide having rutile crystalline structure which comprises hydrolytically precipitating non-peptized, easily filterable hydrous titanium oxide from an aqueous titanium chloride solution containing a small amount of citric acid, separating the said hydrous titanium oxide and calcining it to rutile crystalline structure.

5. Process for the preparation of titanium dioxide having rutile crystalline structure which comprises hydrolytically precipitating non-peptized, easily filterable hydrous titanium oxide from an aqueous titanium chloride solution containing a small amount of phosphoric acid, separating the said hydrous titanium oxide and calcining it to rutile crystalline structure.

WALTER W. PLECHNER.
ARTHUR W. HIXSON.